(12) United States Patent
Scott (10) Patent No.: US 9,383,029 B2
(45) Date of Patent: Jul. 5, 2016

(54) MULTIPLE PISTON PRESSURE INTENSIFIER FOR A SAFETY VALVE

(71) Applicant: Halliburton Energy Services, Inc., Houston, TX (US)

(72) Inventor: Bruce Edward Scott, McKinney, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 42 days.

(21) Appl. No.: 14/374,473

(22) PCT Filed: Sep. 25, 2013

(86) PCT No.: PCT/US2013/061546
§ 371 (c)(1),
(2) Date: Jul. 24, 2014

(87) PCT Pub. No.: WO2015/047235
PCT Pub. Date: Apr. 2, 2015

(65) Prior Publication Data
US 2015/0316170 A1    Nov. 5, 2015

(51) Int. Cl.
| F16K 31/122 | (2006.01) |
| F16K 17/18 | (2006.01) |
| E21B 34/10 | (2006.01) |

(52) U.S. Cl.
CPC .............. *F16K 31/1225* (2013.01); *E21B 34/10* (2013.01); *E21B 34/101* (2013.01); *F16K 17/18* (2013.01)

(58) Field of Classification Search
CPC ... F16K 31/1225; F16K 17/18; F16K 31/122; F16K 31/1226; E21B 34/10; E21B 34/066; E21B 2034/005

USPC ......... 251/62, 77, 31; 137/155; 166/319, 320, 166/332.8, 334.4
See application file for complete search history.

(56) References Cited

U.S. PATENT DOCUMENTS

| 3,901,314 A | * | 8/1975 | Nutter ................ E21B 34/10 166/152 |
| 4,069,871 A | * | 1/1978 | Page, Jr. ............ E21B 34/10 137/458 |

(Continued)

FOREIGN PATENT DOCUMENTS

WO    2015047235 A1    4/2015

OTHER PUBLICATIONS

International Search Report and Written Opinion for PCT/US2013/061546 dated Jun. 26, 2014.

*Primary Examiner* — John K Fristoe, Jr.
*Assistant Examiner* — Andrew J Rost
(74) *Attorney, Agent, or Firm* — McDermott Will & Emery LLP; Scott Richardson (57) ABSTRACT

Disclosed are subsurface safety valves having multiple pistons used to increase the opening force. One safety valve includes a housing having a piston bore defined therein and configured to receive hydraulic fluid pressure, the piston bore providing an upper bore having a first diameter and a lower bore having a second diameter smaller than the first diameter, a piston assembly movably arranged within the piston bore and comprising an upper piston arranged in and configured to sealingly engage the upper bore and a lower piston arranged in and configured to sealingly engage the lower bore, and a connecting rod coupling the upper and lower pistons, wherein a cavity is defined between the upper and lower pistons within the piston bore and the piston rod extends within the cavity.

16 Claims, 4 Drawing Sheets

(56) References Cited

U.S. PATENT DOCUMENTS

| | | | |
|---|---|---|---|
| 4,429,620 A | 2/1984 | Burkhardt et al. | |
| 4,448,254 A * | 5/1984 | Barrington | E21B 34/108 166/321 |
| 4,986,357 A | 1/1991 | Pringle | |
| 7,231,971 B2 * | 6/2007 | McCalvin | E21B 34/10 166/250.01 |
| 7,451,825 B2 * | 11/2008 | Jonas | E21B 34/08 166/316 |
| 7,694,742 B2 | 4/2010 | Bane et al. | |
| 8,016,035 B2 | 9/2011 | Strattan et al. | |
| 8,360,751 B2 | 1/2013 | Duncan | |
| 2008/0237993 A1 | 10/2008 | Bane et al. | |
| 2009/0050327 A1 | 2/2009 | Anderson et al. | |
| 2013/0062071 A1 | 3/2013 | Rytlewski et al. | |
| 2013/0092396 A1 | 4/2013 | Webber et al. | |

\* cited by examiner

MULTIPLE PISTON PRESSURE INTENSIFIER FOR A SAFETY VALVE

BACKGROUND

This application is a National Stage entry of and claims priority to International Application No. PCT/US2013/061546, filed on Sep. 25, 2013.

The present disclosure relates generally to operations performed and equipment utilized in conjunction with subterranean wells and, in particular, to subsurface safety valves having multiple pistons used to increase the opening force for the safety valve.

Subsurface safety valves are well known in the oil and gas industry and act as a failsafe to prevent the uncontrolled release of reservoir fluids in the event of a worst-case scenario surface disaster. Typical subsurface safety valves are flapper-type valves that are opened and closed with the help of a flow tube moving telescopically within the production tubular. The flow tube is often controlled hydraulically from the surface and is forced into its open position using a piston and rod assembly that may be hydraulically charged via a control line linked directly to a hydraulic manifold or pressure control system at the well surface. When sufficient hydraulic pressure is conveyed to the subsurface safety valve via the control line, the piston and rod assembly forces the flow tube downwards, which compresses a spring and simultaneously pushes the flapper downwards to the open position. When the hydraulic pressure is removed from the control line, the spring pushes the flow tube back up, which allows the flapper to move into its closed position.

Depending on the size and depth of the safety valve deployed, the components of the pressure control system used to operate the safety valve can be quite expensive. The cost of a pressure control system may increase as required pressure ratings for the control line and/or the pump equipment increase, which is usually related to the operating depth of the safety valve. There are practical limits to the size and rating of pressure control systems, past which a well operator may not be able to economically or feasibly employ a subsurface safety valve. Accordingly, there is always a need in the industry for the ability to use lower rated pressure control systems for operating subsurface safety valves.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

The present disclosure relates generally to operations performed and equipment utilized in conjunction with subterranean wells and, in particular, to subsurface safety valves having multiple pistons used to increase the opening force for the safety valve.

Disclosed is a subsurface safety valve configured to reduce the pressure required to open the valve at depth. The safety valve includes a piston assembly having a multiple piston configuration including a control pressure piston coupled to a section pressure piston such that the two pistons move simultaneously within a piston bore of the safety valve. The control pressure piston exhibits a larger piston area than the section pressure piston. As a result, hydraulic fluid provided to the piston bore via a control line will work on the larger piston area of the control pressure piston while the section pressure below the piston assembly will work on the smaller piston area of the section pressure piston. Since the piston area of the control pressure piston is enlarged, the control pressure is intensified such that lower rated pressure control systems may be employed.

Figure 1:
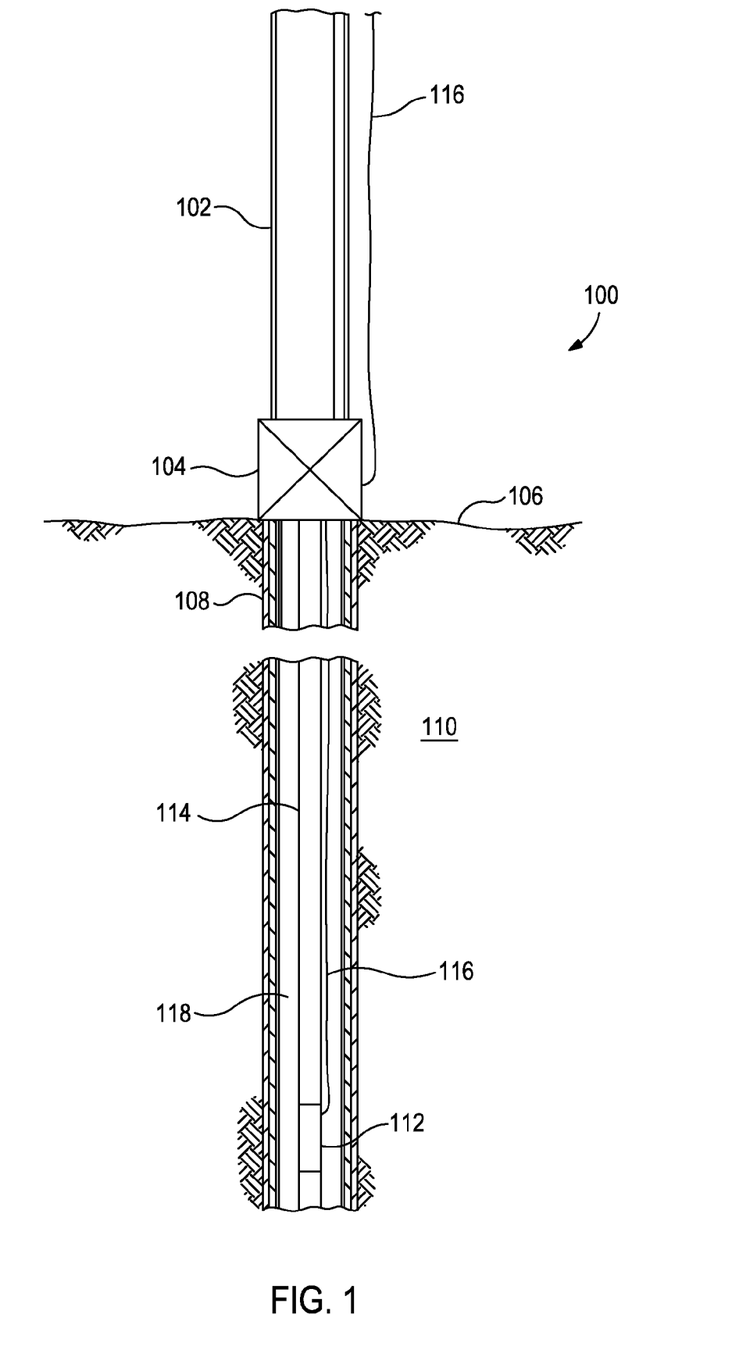
FIG. 1 illustrates a well system that incorporates one or more principles of the present disclosure, according to one or more embodiments.

Referring to FIG. 1, illustrated is a well system 100 that incorporates one or more principles of the present disclosure, according to one or more embodiments. As illustrated, the well system 100 may include a riser 102 extending from a wellhead installation 104 arranged at a sea floor 106. The riser 102 may extend, for example, to an offshore oil and gas platform (not shown). A wellbore 108 extends downward from the wellhead installation 104 through various subterranean formations 110. The wellbore 108 is depicted as being cased, but it could equally be an uncased wellbore 108, without departing from the scope of the disclosure. Although FIG. 1 depicts the well system 100 in the context of an offshore oil and gas application, it will be appreciated by those skilled in the art that the various embodiments disclosed herein are equally well suited for use in or on oil and gas rigs or service rigs, such as land-based oil and gas rigs or rigs located at any other geographical site. Thus, it should be understood that the disclosure is not limited to any particular type of well.

The well system 100 may further include a safety valve 112 interconnected with a tubing string 114 arranged within the wellbore 108 and extending from the wellhead installation 104. The tubing string 114 may be configured to communicate fluids derived from the wellbore 108 and the surrounding subterranean formations 110 to the well surface via the wellhead installation 104. A control line 116 may extend from the well surface and into the wellhead installation 104 which, in turn, conveys the control line 116 into an annulus 118 defined between the wellbore 108 and the tubing string 114. The control line 116 may extend downward within the annulus 118 and eventually become communicably coupled to the safety valve 112. As discussed in more detail below, the control line 116 may be configured to actuate the safety valve 112, for example, to maintain the safety valve 112 in an open position, or otherwise to close the safety valve 112 and thereby prevent a blowout in the event of an emergency.

The control line 116 may be a hydraulic conduit that provides hydraulic fluid pressure to the safety valve 112. In operation, hydraulic fluid may be applied to the control line 116 from a hydraulic pressure control system arranged at a remote location, such as at a production platform or a subsea control station. When properly applied, the hydraulic pressure derived from the control line 116 may be configured to open and maintain the safety valve 112 in its open position, thereby allowing production fluids to flow through the safety valve 112, through the tubing string 114, and upwards towards the rig. To move the safety valve 112 from its open position and into a closed position, the hydraulic pressure in the control line 116 may be reduced or otherwise eliminated.

Although the control line 116 is depicted in FIG. 1 as being arranged external to the tubing string 114, it will be readily appreciated by those skilled in the art that any arrangement or configuration of the control line 116 may be used to convey actuation pressure to the safety valve 112. For example, the control line 116 could be arranged internal to the tubing string 114, or otherwise formed in a sidewall of the tubing string 114. The control line 116 could extend from a remote location, such as from the earth's surface, or another location in the wellbore 108. In yet other embodiments, the pressure required to actuate the safety valve 112 may be derived from a pressure control system located downhole and communicably coupled to the control line 116 at a location.

In the following description of the representative embodiments of the disclosure, directional terms such as "above", "below", "upper", "lower", etc., are used for convenience in referring to the accompanying drawings. In general, "above", "upper", "upward" and similar terms refer to a direction toward the earth's surface along the wellbore 108, and "below", "lower", "downward" and similar terms refer to a direction away from the earth's surface along the wellbore 108.

Figure 2A:
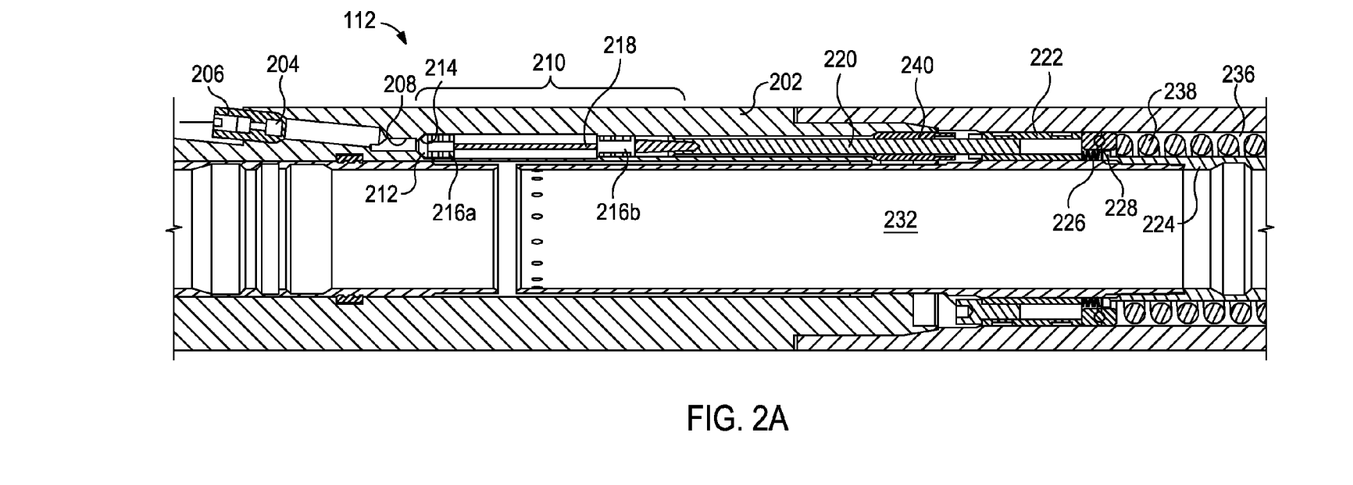
FIGS. 2A and 2B illustrate cross-sectional side views of the exemplary safety valve of FIG. 1, according to one or more embodiments.
Figure 2B:
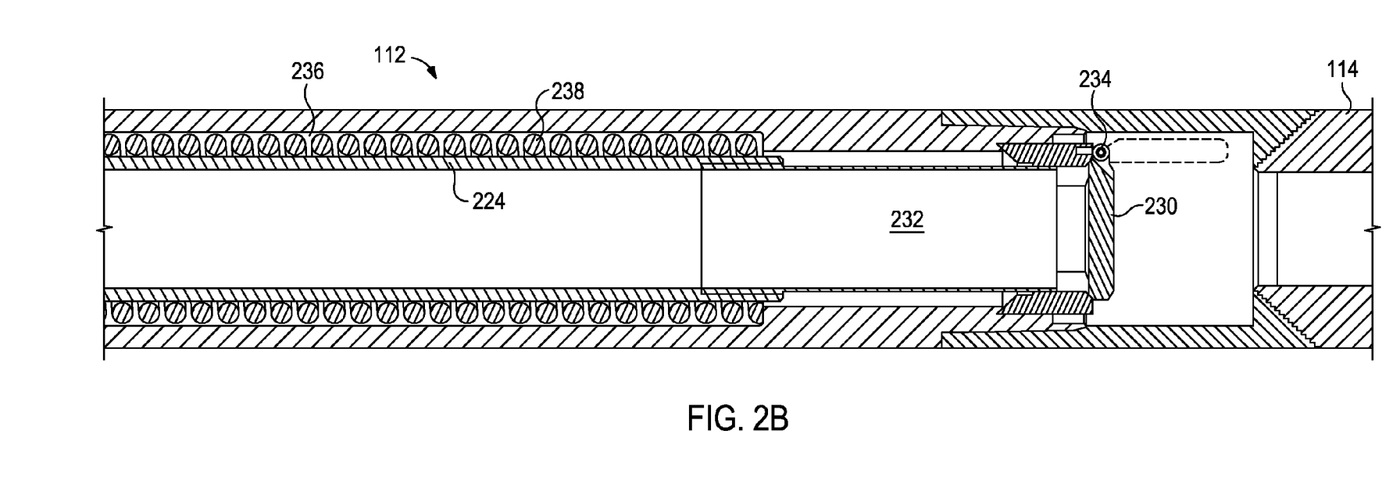

Referring now to FIGS. 2A and 2B, with continued reference to FIG. 1, illustrated are cross-sectional side views of an exemplary embodiment of the safety valve 112, according to one or more embodiments. In particular, the safety valve 112 is depicted in FIGS. 2A and 2B in successive sectional views, where FIG. 2A depicts an upper portion of the safety valve 112 and FIG. 2B depicts a lower portion of the safety valve 112. As illustrated, the safety valve 112 may include a housing 202 that is able to be coupled to the tubing string 114 at opposing ends of the housing 202 (tubing string 114 shown only in FIG. 2B).

A control line port 204 may be defined or otherwise provided in the housing 202 for connecting the control line 116 (FIG. 1) to the safety valve 112. The port 204 is shown in FIG. 2A as being plugged with a set screw 206 or other type of plugging device. However, when the control line 116 is appropriately connected to the first port 204 the control line 116 is placed in fluid communication with a piston bore 208 and able to convey hydraulic fluid pressure thereto. The piston bore 208 may be an elongate channel or conduit defined within the housing 202 and configured to extend longitudinally along a portion of the axial length of the safety valve 112.

A piston assembly 210 may be arranged within the piston bore 208 and configured to translate axially therein. The piston assembly 210 may include a piston head 212 configured to mate with and otherwise bias an up stop 214 defined within the piston bore 208 when the piston assembly 210 is forced upwards in the direction of the control line port 204. The up stop 214 may be a radial shoulder defined within the piston bore 208 and having a reduced diameter and an axial surface configured to engage a corresponding axial surface of the piston head 212. In other embodiments, the up stop 214 may be any device or means arranged within the piston bore 208 that is configured to stop the axial movement of the piston assembly 210 as it advances upward within the piston bore and toward the control line port 204.

The piston assembly 210 may also include a first or upper piston 216a and a second or lower piston 216b coupled thereto via a connecting rod 218. The lower piston 216b may be coupled to a piston rod 220 that extends longitudinally from the piston assembly 210 through at least a portion of the piston bore 208. At a distal end thereof, the piston rod 220 may be coupled to an actuator sleeve 222, which may be configured to effectively couple the piston assembly 210 to a flow tube 224 that is movably arranged within the safety valve 112. More particularly, the actuator sleeve 222 may engage a biasing device 226 (e.g., a compression spring, a series of Belleville washers, or the like) arranged axially between the actuator sleeve 222 and an actuation flange 228 that forms part of the proximal end of the flow tube 224. As the actuator sleeve 222 acts on the biasing device 226 (e.g., axial force), the actuation flange 228 and the flow tube 224 correspondingly move.

Referring to FIG. 2B, the safety valve 112 may also include a valve closure device 230 that selectively opens and closes a flow passage 232 defined through the interior of the safety valve 112. The valve closure device 230 may be a flapper, as generally known to those skilled in the art. It should be noted, however, that although the safety valve 112 is depicted as being a flapper-type safety valve, those skilled in the art will readily appreciate that any type of closure device 230 may be employed, without departing from the scope of the disclosure. For example, in some embodiments, the closure device 230 could instead be a ball, a sleeve, etc.

As shown in FIG. 2B, the closure device 230 is in its closed position whereby the closure device 230 is able to substantially block fluid flow into and through the flow passage 232 from downhole (i.e., from the right in FIG. 2B). A torsion spring 234 biases the closure device 230 to pivot to its closed position. As described below, the piston assembly 210 is used to displace the flow tube 224 downward (i.e., to the right in FIG. 2B) to engage the closure device 230 and overcome the spring force of the torsion spring 234. When the flow tube 224 is extended to its downward position, it engages the closure device 230 and moves the closure device 230 from its closed position to an open position (shown in phantom as dashed lines). When the flow tube 224 is displaced back upward (i.e., to the left in FIG. 2B), the torsion spring 234 is able to pivot the closure device 230 back to its closed position. Axial movement of the piston assembly 210 within the piston bore 208 will force the flow tube 224 to correspondingly move axially within the flow passage 232, and either open the closure device 230 or allow it to close, depending on its relative position.

The safety valve 112 may further define a lower chamber 236 within the housing 202. In some embodiments, the lower chamber 236 may form part of the piston bore 208, such as being an elongate extension thereof. A power spring 238, such as a coil or compression spring, may be arranged within the lower chamber 236. The power spring 238 may be configured to bias the actuation flange 228 and actuation sleeve 222 upwardly which, in turn, biases the piston assembly 210 in the same direction. Accordingly, expansion of the power spring 238 will cause the piston assembly 210 to move upwardly within the piston bore 208.

It should be noted that while the power spring 238 is depicted as a coiled compression spring, any type of biasing device may be used instead of, or in addition to, the power spring 238, without departing from the scope of the disclosure. For example, a compressed gas, such as nitrogen, with appropriate seals may be used in place of the power spring 238. In other embodiments, the compressed gas may be contained in a separate chamber and tapped when needed.

In exemplary operation, the safety valve 112 may be actuated in order to open the closure device 230. This may be accomplished by conveying a hydraulic fluid under pressure to the control line port 204 via the control line 116 (FIG. 1). As hydraulic pressure is provided to the piston bore 208, the piston assembly 210 may be forced to move axially downward within the piston bore 208. As the piston assembly 210 moves, the piston rod 220 mechanically transfers the hydraulic force to the actuation sleeve 222 and the actuation flange 228, thereby correspondingly displacing the flow tube 224 in the downward direction. In other words, as the piston assembly 210 moves axially within the piston bore 208, the flow tube 224 correspondingly moves in the same direction. As the flow tube 224 moves downward, it engages the closure device 230, overcomes the spring force of the torsion spring 234, and thereby pivots the closure device 230 to its open position to permit fluids to enter the flow passage 232 from downhole (i.e., from the right in FIG. 2B).

Moreover, as the piston assembly 210 moves axially downward within the piston bore 208, the power spring 238 is compressed within the lower chamber 236 and progressively builds spring force. In at least one embodiment, the piston assembly 210 will continue its axial movement in the downward direction, and thereby continue to compress the power spring 238, until engaging a down stop 240 (FIG. 2A) arranged within the piston bore 208. A metal-to-metal seal may be created between the piston assembly 210 and the down stop 240 such that the migration of fluids (e.g., hydraulic fluids, production fluids, etc.) therethrough is generally prevented.

Upon reducing or eliminating the hydraulic pressure provided via the control line 116, the spring force built up in the power spring 238 may be allowed to release and displace the piston assembly 210 upwards within the piston bore 208, thereby correspondingly moving the flow tube 224 in the same direction. The section pressure within the safety valve 112 below the lower piston 216b also serves to move the piston assembly 210 upwards within the piston bore 208. As the flow tube 224 moves axially upwards, it will eventually move out of engagement with the closure device 230. Once free from engagement with the flow tube 224, the spring force of the torsion spring 234 will pivot the closure device 230 back into its closed position.

In at least one embodiment, the piston assembly 210 will continue its axial movement in the upward direction until the piston head 212 of the piston assembly 210 engages the up stop 214 and effectively prevents the piston assembly 210 from further upward movement. Engagement between the piston head 212 and the up stop 214 may generate a mechanical metal-to-metal seal between the two components to prevent the migration of fluids (e.g., hydraulic fluids, production fluids, etc.) therethrough.

When the safety valve 112 is deployed downhole, the "section" pressure, or fluid pressure present within the wellbore 108 (FIG. 1) and annulus 118 (FIG. 1) at depth, cooperatively act on the piston assembly 210. More specifically, the section pressure acts on the downhole end of the piston assembly 210 via the piston bore 208, and provides a corresponding closing force on the safety valve 112 that urges the piston assembly 210 toward the up stop 214. In order to open the safety valve 112, the piston assembly 210 must effectively overcome the section pressure and the spring force of the power spring 238. To do this, the hydraulic fluid pressure ("control" pressure) conveyed into the piston bore 208 via the control line 116 (FIG. 1) must be supplied at a pressure that exceeds the combined force of the section pressure and the power spring 238. Moreover, this hydraulic pressure must incrementally increase as the piston assembly 210 translates downward within the piston bore 208 to counteract the increasing spring force that builds as the power spring 238 is compressed. As indicated above, this oftentimes requires expensive pressure control systems that may be infeasible or uneconomical for some applications.

According to one or more embodiments of the present disclosure, the pressure required to open the safety valve 112 may be reduced or otherwise minimized by increasing the downward force derived from the control pressure and simultaneously decreasing the upward force derived from the section pressure. This can be accomplished by having a multiple piston configuration in the piston assembly 210 whereby the control pressure piston (i.e., the first piston 216a) exhibits a larger piston area than the section pressure piston (i.e., the second piston 216b). As a result, the control pressure will work on the larger piston area of the control pressure piston and the section pressure will work on the smaller piston area of the section pressure piston, thereby intensifying the available force from the control pressure.

Figure 3A:
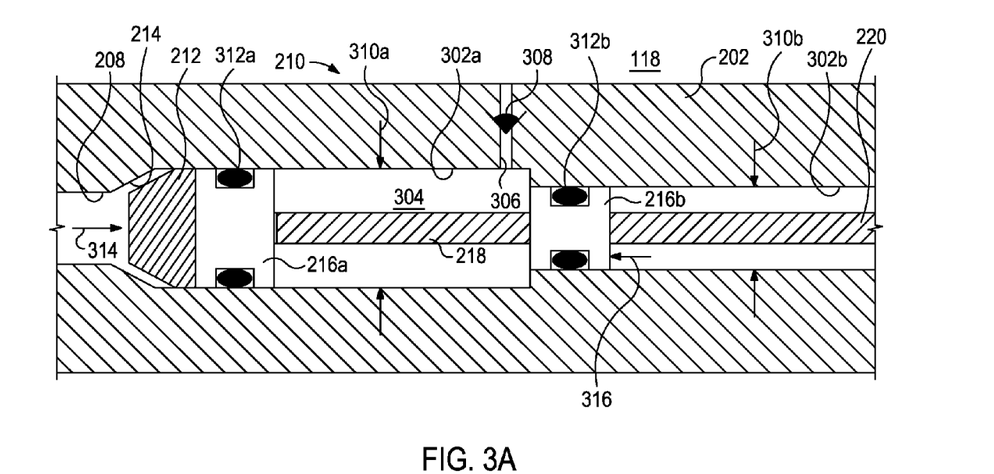
FIGS. 3A and 3B illustrate enlarged cross-sectional side views of an exemplary embodiment of the piston assembly of FIG. 2A, according to one or more embodiments.
Figure 3B:
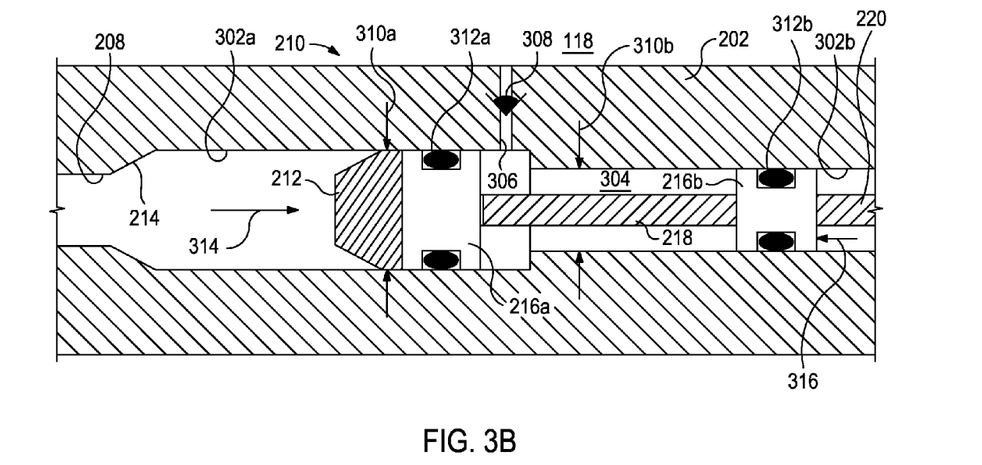

Referring now to FIGS. 3A and 3B, with continued reference to FIGS. 2A and 2B, illustrated are enlarged cross-sectional side views of an exemplary embodiment of the piston assembly 210, according to one or more embodiments. Like numerals in FIGS. 3A and 3B that are used in prior figures indicate like elements and/or components that will not be described again in detail. FIG. 3A depicts the piston assembly 210 in a first position, where the safety valve 112 (FIGS. 2A-2B) is closed, as generally discussed above. FIG. 3B depicts the piston assembly 210 in a second position, where the safety valve 112 has been opened, as also generally discussed above.

As illustrated, the piston assembly 210 may be arranged within the piston bore 208 defined in the housing 202 of the safety valve 112 (FIGS. 2A-2B). The piston bore 208 may be divided into a first or upper bore 302a and a second or lower bore 302b. The first piston 216a may be generally arranged in the upper bore 302a, and the second piston 216b may be generally arranged in the lower bore 302b. The first and second pistons 216a,b may be axially offset from each other within the piston bore 208 and coupled together using the connecting rod 218. The connecting rod 218 may threadably or mechanically attach the first and second pistons 216a,b to each other such that simultaneous movement of each piston 216a,b is achieved when the piston assembly 210 axially translates within the piston bore 208.

With the first and second pistons 216a,b structurally coupled via the connecting rod 218, a chamber or cavity 304 may be defined therebetween within the piston bore 208. The cavity 304 may be configured to correspondingly move with the first and second pistons 216a,b when the piston assembly 210 moves within the piston bore 208. In some embodiments, the cavity 304 may be filled with a fluid. In one or more embodiments, for example, the cavity 304 may be filled with a gas, such as air or an inert gas (e.g., nitrogen, argon, etc.). In other embodiments, however, the cavity 304 may be filled with a hydraulic fluid, a wellbore fluid, water (i.e., brine, fresh water, etc.), or any other liquid.

In one or more embodiments, the cavity 304 may be ported to the annulus 118 within the wellbore 108 (FIG. 1) where the safety valve 112 (FIGS. 2A-2B) is to be located. More particularly, the piston assembly 210 may further include a conduit 306 defined in the housing 202 that places the cavity 304 in fluid communication with the annulus 118 surrounding the safety valve 112. Porting the cavity 304 to the annulus 118 may help compensate for expansion and contraction of the fluid within the cavity 304 as the wellbore 108 heats up or cools down. At increased temperatures, the pressure within the cavity 304 will increase and porting the fluid to the annulus 118 may help maintain a safe operating pressure equilibrium. Porting the fluid to the annulus 118 may also prevent the first and second pistons 216a,b from locking under vacuum as temperatures decrease in the cavity 304 and the pressure correspondingly decreases.

In at least one embodiment, a pressure regulator 308 may be arranged within the conduit 306. The pressure regulator 308 may be used to generally separate the fluid within the cavity 304 from any fluids present in the annulus 118. In operation, the pressure regulator 308 may be configured to axially translate within the conduit 306, thereby separating the fluid within the cavity 304 from fluids in the annulus 118, but also compensate for expansion and contraction of the fluid within the cavity 304 and thereby help maintain safe operating pressure equilibrium. In some embodiments, the pressure regulator 308 may be a balance piston. In other embodiments, however, the pressure regulator 308 may be a floating piston, or the like, without departing from the scope of the disclosure.

The upper bore 302a may exhibit a first diameter 310a and the lower bore 302b may exhibit a second diameter 310b that is smaller or less than the first diameter 310a. The first piston 216a may be sized or otherwise configured such that it is able to sealingly engage the inner wall of the upper bore 302a, and the second piston 216b may be sized or otherwise configured such that it is able to sealingly engage the inner wall of the lower bore 302b. To accomplish this, the first piston 216a may include one or more first dynamic seals 312a and the second piston 216b may include one or more second dynamic seals 312b.

As used herein, the term "dynamic seal" is used to indicate a seal that provides pressure isolation between members that have relative displacement therebetween, for example, a seal which seals against a displacing surface, or a seal carried on one member and sealing against the other member, etc. A dynamic seal may comprise a material selected from the following: elastomeric materials, non-elastomeric materials, metals, composites, rubbers, ceramics, derivatives thereof, and any combination thereof. A dynamic seal may be attached to each of the relatively displacing members, such as a bellows or a flexible membrane. A dynamic seal may be attached to either of the relatively displacing members, such as in the case of a floating piston.

The first and second dynamic seals 312a,b may be configured to "dynamically" seal against corresponding portions of the inner wall of the piston bore 208 as the piston assembly 210 moves axially therein. More particularly, the first dynamic seal 312a may be configured to seal against the inner wall of the upper bore 302a as the first piston 216a moves therein, and the second dynamic seal 312b may be configured to seal against the inner wall of the lower bore 302b as the second piston 216b moves therein. As a result, the first and second dynamic seals 312a,b may be configured to prevent any fluids from migrating past the first and second pistons 216a,b respectively. In some embodiments, one or both of the first and second dynamic seals 312a,b may be O-rings or the like, as illustrated. In other embodiments, however, one or both of the first and second dynamic seals 312a,b may be v-rings or CHEVRON® packing rings or other appropriate seal configurations (e.g., seals that are round, v-shaped, u-shaped, square, oval, t-shaped, etc.), as generally known to those skilled in the art.

In exemplary operation, hydraulic pressure or "control" pressure (generally indicated by the arrow 314) is introduced into the piston bore 208 via the control line 116 (FIG. 1) and associated port 204 (FIG. 2A). The control pressure 314 communicates with and otherwise acts on the first piston 216a, thereby separating the piston head 212 from the up stop 214 and moving the piston assembly 210 in the downward direction (i.e., to the right in FIGS. 3A and 3B). An opposing "section" pressure (generally indicated by the arrow 316) communicates with and otherwise acts on the second piston 216b. As mentioned above, the section pressure 316 and the spring force of the power spring 238 (FIGS. 2A-2B) cooperatively act against the control pressure 314.

Referring to FIG. 3B, the piston assembly 210 has moved to the second position, thereby correspondingly moving the cavity 304 defined between the first and second pistons 216a, b. As generally described above, while the piston assembly 210 moves from its first position into its second position, the piston rod 220 mechanically transfers the hydraulic force of the control pressure 314 to the flow tube 224 (FIGS. 2A-2B), thereby correspondingly displacing the flow tube 224 in the downward direction and opening the closure device 230 (FIG. 2B). Moreover, while the piston assembly 210 moves from its first position into its second position, the first and second dynamic seals 312a,b sealingly engage the inner walls of the upper and lower bores 302a,b, respectively.

Since the piston area of the first piston 216a is greater than the piston area of the second piston 216b, the control pressure 314 required to open the safety valve 112 is correspondingly reduced. Moreover, since the second piston 216b exhibits a smaller piston area, the section pressure 316 applied to the second piston 216b is minimized with respect to the first piston 216a and thereby more easily overcome by the control pressure 314. As a result, an operator may be able to employ a smaller or reduced pressure control system used to convey the control pressure 314 to the safety valve 112, including using control lines and pump equipment that exhibit lower pressure ratings than would otherwise be used in a safety valve at similar depths. Smaller or reduced pressure control systems may be advantageous for safety reasons (i.e., lower pressures are typically safer than higher pressures), cost (i.e., reducing the size of the pump and the pressure rating of the pump and control lines can result in significant cost savings), and physical restraints (i.e., lower pressure equipment normally exhibits a smaller footprint than higher pressure equipment).

Figure 4A:
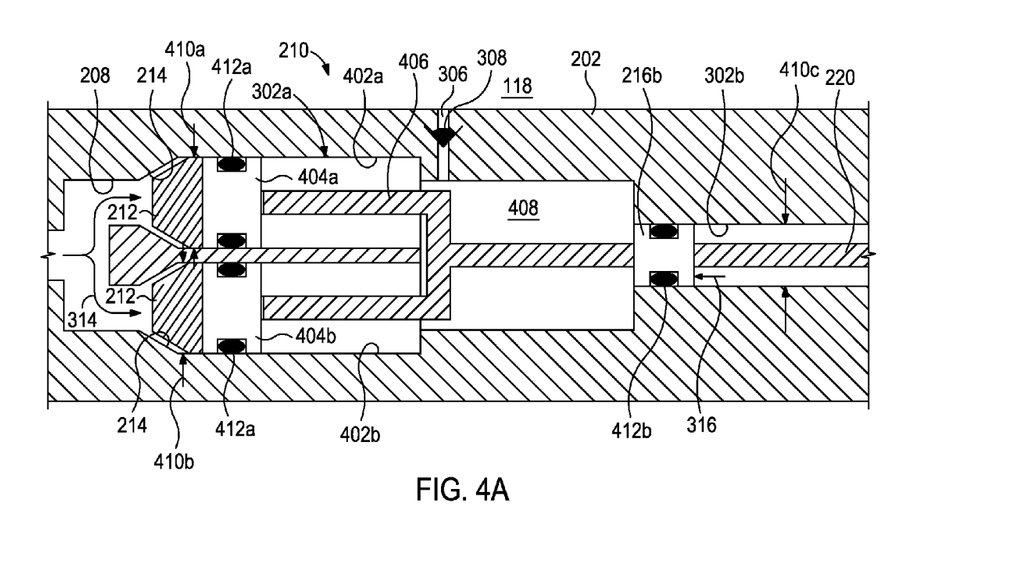
FIGS. 4A and 4B illustrate enlarged cross-sectional side views of another exemplary embodiment of the piston assembly of FIG. 2A, according to one or more embodiments.
Figure 4B:
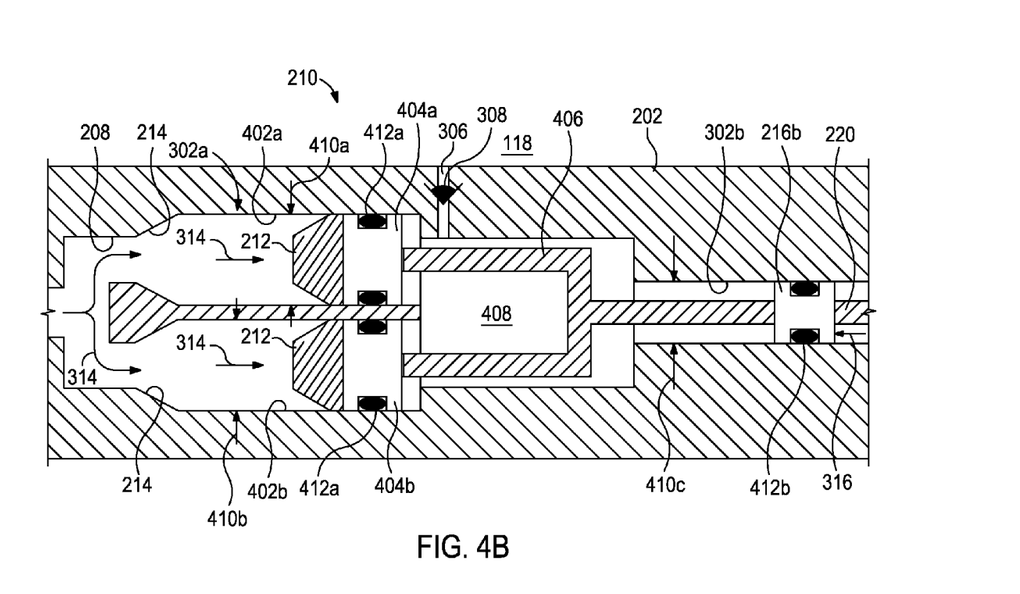

Referring now to FIGS. 4A and 4B, with continued reference to FIGS. 2A-2B and 3A-3B, illustrated are enlarged cross-sectional side views of another exemplary embodiment of the piston assembly 210, according to one or more embodiments. Like numerals are used to indicate like elements and/or components from prior figures that will not be described again in detail. FIG. 4A depicts the piston assembly 210 in a first position, where the safety valve 112 (FIGS. 2A-2B) is closed, as generally discussed above. FIG. 4B depicts the piston assembly 210 in a second position, where the safety valve 112 has been opened, as also generally discussed above.

Similar to the piston assembly 210 depicted in FIGS. 3A-3B, the piston assembly 210 in FIGS. 4A-4B is arranged within the piston bore 208 defined in the housing 202 and the piston bore 208 includes an upper bore 302a and a lower bore 302b. The upper bore 302a in FIGS. 4A-4B, however, may be divided into a first upper bore 402a and a second upper bore 402b to accommodate a first upper piston 404a and a second upper piston 404b. In some embodiments, the first and second upper bores 402a,b may be radially offset from each other within the housing 202 (i.e., radially offset from each other with respect to the longitudinal central axis of the safety valve 112). In other embodiments, the first and second upper bores 402a,b may be angularly or circumferentially offset from each other within the housing 202. In other words, the first and second upper bores 402a,b may also be laterally offset from each other about the circumference of the housing 202, without departing from the scope of the disclosure.

The first and second upper pistons 404a,b may be operably coupled to each other with a connecting rod 406. The connecting rod 406 may be u-shaped and/or otherwise connected at an intermediate point such that it is able to extend into each of the first and second upper bores 402a,b and attach to the first and second upper pistons 404a,b. As a result, the first and second upper pistons 404a,b are able to move simultaneously and thereby act as a single piston member. The connecting rod 406 may also be coupled to the second or lower piston 216b. The connecting rod 406 may threadably or mechanically attach the first and second upper pistons 404a,b to the second piston 216b such that simultaneous movement of each piston 404a,b and 216b is achieved when the piston assembly 210 axially translates within the piston bore 208.

A cavity 408 may be defined between the first and second upper pistons 404a,b and the second piston 216b within the piston bore 208. The cavity 408 may be configured to correspondingly move or shift within the piston bore 208 when the piston assembly 210 moves therein. Similar to the cavity 304 of FIGS. 3A-3B, the cavity 408 may be filled with a fluid, such as a gas (e.g., air, an inert gas, etc.), or a liquid (e.g., hydraulic fluid, wellbore fluid, water, such as brine or fresh water), combinations thereof, or the like. As illustrated, the cavity 408 may also be ported to the annulus 118 via the conduit 306 in order to place the cavity 408 in fluid communication with the annulus 118. In some embodiments, the pressure regulator 308 may be arranged within the conduit 306 in order to maintain pressure equilibrium within the cavity 408.

The first upper bore 402a may exhibit a first diameter 410a, the second upper bore 402b may exhibit a second diameter 410b, and the lower bore 302b may exhibit a third diameter 410c. In some embodiments, the first and second diameters 410a,b may be the same. In other embodiments, the first and second diameters 410a,b may be different. Moreover, in some embodiments, one or both of the first and second diameters 410a,b may be greater than the third diameter 410c. In other embodiments, one or both of the first and second diameters 410a,b may be smaller than the third diameter 410c. In any event, the combined sizing of the first and second diameters 410a,b is greater than the third diameter 410c, such that the combined piston area of the first and second upper pistons 404a,b is greater than the piston area of the second piston 216b.

The first and second upper pistons 404a,b may be sized or otherwise configured to sealingly engage the inner walls of the first and second upper bores 402a,b, respectively, and the second piston 216b may be sized or otherwise configured such that it is able to sealingly engage the inner wall of the lower bore 302b. To accomplish this, the first and second upper pistons 404a,b may include one or more first dynamic seals 412a and the second piston 216b may include one or more second dynamic seals 412b. Similar to the dynamic seals 312a,b of FIGS. 3A-3B, the dynamic seals 412a,b may be configured to "dynamically" seal against corresponding portions of the inner wall of the piston bore 208 as the piston assembly 210 moves axially therein. More particularly, the dynamic seal 412a of the first upper piston 404a may be configured to seal against the inner wall of the first upper bore 402a, the dynamic seal 412a of the second upper piston 404b may be configured to seal against the inner wall of the second upper bore 402b, and the dynamic seal 412b of the second piston 216b may be configured to seal against the inner wall of the lower bore 302b. Moreover, similar to the dynamic seals 312a,b of FIGS. 3A-3B, the dynamic seals 412a,b may be one of an O-ring, one or more v-rings or CHEVRON® packing rings, or other appropriate seal configurations described herein.

In exemplary operation, hydraulic control pressure 314 is introduced into the piston bore 208 in order to act on the piston assembly 210 and move the safety valve 112 (FIGS. 2A-2B) into the open position. More particularly, the control pressure 314 may be provided to the control line port 204 (FIG. 2A) via the control line 116 (FIG. 1), and the control line port 204 may feed the hydraulic fluid into the piston bore 208, which splits and feeds the control pressure 314 into the first and second upper bores 402a,b. The control pressure 314 communicates with and otherwise acts on the first and second upper pistons 404a,b, thereby separating the piston head 212 of each first and second upper piston 404a,b from corresponding up stops 214 defined in the piston bore 208 and moving the piston assembly 210 in the downward direction (i.e., to the right in FIGS. 4A and 4B). The opposing section pressure 316 communicates with and otherwise acts on the second piston 216b.

As shown in FIG. 4B, the piston assembly 210 has moved to the second position, thereby correspondingly moving the flow tube 224 (FIGS. 2A-2B) in the downward direction and opening the closure device 230 (FIG. 2B), as generally described above. Moreover, while the piston assembly 210 moves from the first position into the second position, the dynamic seals 412a,b sealingly engage the inner walls of the first and second upper bores 402a,b and the lower bore 302b, respectively.

Adding additional pistons to the piston assembly 210 increases the piston area available for the control pressure 314 to act on in moving the piston assembly 210 from its first position (FIG. 4A) to its second position (FIG. 4B). Since the combined piston area of the first and second upper pistons 404a,b is greater than the piston area of the second piston 216b, the control pressure 314 required to open the safety valve 112 has been correspondingly reduced. Moreover, since the second piston 216b exhibits a smaller piston area than the combined piston areas of the first and second upper pistons 404a,b, the section pressure 316 applied to the second piston 216b is minimized with respect to the first and second upper pistons 404a,b and thereby more easily overcome by the control pressure 314. As a result, an operator may be able to employ smaller or less expensive pressure control equipment used to convey the control pressure 314 to the safety valve 112.

Furthermore, by employing additional upper pistons in the piston assembly 210, an operator may be able to obtain a desired ratio between the upper and lower pistons, thereby allowing for smaller upper pistons. Smaller upper pistons can reduce the effective cross section of the upper piston section, which can effectively reduce the outer diameter of the subsurface safety valve. As a result, the overall cost of the safety valve may correspondingly be reduced and allow the safety valve to be used in a greater number of wells. Moreover, a smaller outer diameter for the safety valve allows the operator to run smaller casing whereas a larger outer diameter safety valve requires the operator to run larger casing which increases well completion costs.

While FIGS. 4A and 4B depict first and second upper pistons 404a,b being used in the piston assembly 210, it will be appreciated that more than two upper pistons (e.g., first pistons 302a) may be employed without departing from the scope of the disclosure. Each additional upper piston may be operatively coupled to the control rod 406 and effectively increase the piston area available for the control pressure 314 to act on, thereby reducing the required amount of control pressure 314 to open the safety valve.

Embodiments disclosed herein include:

A. A safety valve that includes a housing having a piston bore defined therein and configured to receive hydraulic fluid pressure from a control line, the piston bore providing an upper bore having a first diameter and a lower bore having a second diameter smaller than the first diameter, a piston assembly movably arranged within the piston bore and comprising an upper piston arranged in and configured to sealingly engage the upper bore and a lower piston arranged in and configured to sealingly engage the lower bore, and a connecting rod coupling the upper and lower pistons such that simultaneous movement of each piston is achieved when the piston assembly moves within the piston bore, wherein a cavity is defined between the upper and lower pistons and the connecting rod extends within the cavity.

B. A method of actuating a safety valve that includes conveying hydraulic fluid pressure to a piston bore that provides an upper bore having a first diameter and a lower bore having a second diameter smaller than the first diameter, wherein a piston assembly is movably arranged within the piston bore and comprises an upper piston arranged in and sealingly engaging the upper bore and a lower piston arranged in and sealingly engaging the lower bore, axially displacing the piston assembly within the piston bore as the hydraulic fluid pressure acts on the upper piston, wherein a connecting rod couples the upper and lower pistons such that simultaneous movement of each piston is achieved when the piston assembly moves within the piston bore, and wherein a cavity is defined between the upper and lower pistons within the piston bore and the connecting rod extends within the cavity.

Each of embodiments A and B may have one or more of the following additional elements in any combination: Element 1: wherein the cavity contains a fluid. Element 2: further comprising a conduit defined in the housing that fluidly communicates the cavity with a region surrounding the housing. Element 3: further comprising a pressure regulator arranged within the conduit for balancing pressures between the cavity and the region surrounding the housing. Element 4: wherein the upper and lower pistons each comprise one or more dynamic seals configured to seal against corresponding inner walls of the upper and lower bores, respectively. Element 5: further comprising a piston rod that extends longitudinally from the lower piston through at least a portion of the piston bore, a flow tube operably coupled to the piston rod and movably arranged within a flow passage defined in the safety valve in response to the movement of the piston assembly, and a valve closure device movable between an open position and a closed position and adapted to restrict fluid flow through the flow passage when in the closed position, wherein the flow tube is adapted to shift the valve closure device between open and closed positions. Element 6: further comprising a power spring arranged within a lower chamber defined within the housing and configured to bias the piston assembly upwardly within the piston bore. Element 7: wherein the upper bore is divided into a first upper bore and a second upper bore and wherein the upper piston comprises a first upper piston arranged within and sealingly engaging the first upper bore and a second upper piston arranged within and sealing engaging the second upper bore. Element 8: wherein the first and second upper bores are radially offset from each other within the housing. Element 9: wherein the first and second upper bores are angularly offset from each other about a circumference of the housing. Element 10: wherein the connecting rod splits and extends into each of the first and second upper bores and attaches to each of the first and second upper pistons. Element 11: wherein a combined piston area of the first and second upper pistons is greater than a piston area of the lower piston.

Element 12: wherein conveying the hydraulic fluid pressure to the piston bore comprises conveying hydraulic fluid to the piston bore via a control line. Element 13: wherein a piston area of the upper piston is greater than a piston area of the lower piston, and wherein axially displacing the piston assembly comprises overcoming an opposing section pressure acting on the lower piston. Element 14: wherein the upper and lower pistons each comprise one or more dynamic seals, the method further comprising sealingly engaging a corresponding inner walls of the upper and lower bores with the dynamic seals of the upper and lower pistons, respectively. Element 15: wherein the piston assembly further comprises a piston rod that extends longitudinally from the lower piston through at least a portion of the piston bore and is operably coupled to a flow tube movably arranged within a flow passage defined in the safety valve, the method further comprising axially displacing the flow tube as the piston assembly moves within the piston bore, compressing a power spring as the piston assembly is axially displaced by the hydraulic fluid pressure, and moving a valve closure device with the flow tube from a closed position which restricts fluid flow through the flow passage to an open position. Element 16: wherein the cavity contains a fluid and the method further comprises fluidly communicating the cavity and an annulus region with a conduit defined in a housing that houses the piston assembly. Element 17: further comprising balancing pressures between the cavity and the annulus region with a pressure regulator arranged within the conduit. Element 18: wherein the upper bore is divided into a first upper bore and a second upper bore and wherein the upper piston comprises a first upper piston and a second upper piston, the method further comprising sealingly engaging the first upper bore with the first upper piston, and sealingly engaging the second upper bore with the second upper piston, wherein a combined piston area of the first and second upper pistons is greater than a piston area of the lower piston.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A method of actuating a safety valve, comprising:
conveying hydraulic fluid pressure to a piston bore defined in a sidewall of a housing and providing an upper bore having a first diameter and a lower bore having a second diameter smaller than the first diameter, wherein a piston assembly is movably arranged within the piston bore and comprises an upper piston sealingly engaging the upper bore and a lower piston sealingly engaging the lower bore;
axially displacing the piston assembly within the piston bore as the hydraulic fluid pressure acts on the upper piston, wherein a connecting rod couples the upper and lower pistons such that simultaneous movement of each piston is achieved when the piston assembly moves within the piston bore, and wherein a cavity is defined between the upper and lower pistons within the piston bore and the connecting rod extends within the cavity;
maintaining pressure equilibrium within the cavity and an annulus region with a conduit defined in the housing; and
moving a valve closure device as the piston assembly moves within the piston bore, the valve closure device being arranged within a central flow passage defined in the housing and operably coupled to the piston assembly.

2. The method of claim 1, wherein conveying the hydraulic fluid pressure to the piston bore comprises conveying hydraulic fluid to the piston bore via a control line.

3. The method of claim 1, wherein a piston area of the upper piston is greater than a piston area of the lower piston, and wherein axially displacing the piston assembly comprises overcoming an opposing section pressure acting on the lower piston.

4. The method of claim 1, wherein the upper and lower pistons each comprise one or more dynamic seals, the method further comprising sealingly engaging a corresponding inner walls of the upper and lower bores with the dynamic seals of the upper and lower pistons, respectively.

5. The method of claim 1, wherein the piston assembly further comprises a piston rod that extends longitudinally from the lower piston through at least a portion of the piston bore and is operably coupled to a flow tube movably arranged within a flow passage defined in the safety valve, the method further comprising:
axially displacing the flow tube as the piston assembly moves within the piston bore;
compressing a power spring as the piston assembly is axially displaced by the hydraulic fluid pressure; and
moving the valve closure device with the flow tube from a closed position which restricts fluid flow through the flow passage to an open position.

6. The method of claim 1, further comprising balancing pressures between the cavity and the annulus region with a pressure regulator arranged within the conduit.

7. The method of claim 1, wherein the upper bore is divided into a first upper bore and a second upper bore and wherein the upper piston comprises a first upper piston and a second upper piston, the method further comprising:
sealingly engaging the first upper bore with the first upper piston; and
sealingly engaging the second upper bore with the second upper piston, wherein a combined piston area of the first and second upper pistons is greater than a piston area of the lower piston.

8. A safety valve, comprising:
a housing that defines a central flow passage;
a valve closure device movably arranged within the central flow passage;
a piston bore defined in a sidewall of the housing to receive hydraulic fluid pressure from a control line, the piston bore providing an upper bore having a first diameter and a lower bore having a second diameter smaller than the first diameter;
a piston assembly movably arranged within the piston bore and operably coupled to the valve closure device, the piston assembly comprising an upper piston that sealingly engages the upper bore and a lower piston that sealingly engages the lower bore;
a connecting rod coupling the upper and lower pistons such that simultaneous movement of each piston is achieved when the piston assembly moves within the piston bore, wherein a cavity is defined between the upper and lower pistons and the connecting rod extends within the cavity; and
a conduit defined in the housing that fluidly communicates the cavity with a region surrounding the housing, wherein movement of the piston assembly correspondingly moves the valve closure device.

9. The safety valve of claim 8, further comprising a pressure regulator arranged within the conduit for balancing pressures between the cavity and the region surrounding the housing.

10. The safety valve of claim 8, wherein the upper and lower pistons each comprise one or more dynamic seals configured to seal against corresponding inner walls of the upper and lower bores, respectively.

11. The safety valve of claim 8, further comprising:
a piston rod that extends longitudinally from the lower piston through at least a portion of the piston bore; and
a flow tube operably coupled to the piston rod and movably arranged within the central flow passage in response to the movement of the piston assembly,
wherein movement of the flow tube moves the valve closure device between an open position and a closed position to regulate fluid flow through the central flow passage.

12. The safety valve of claim 8, further comprising a power spring arranged within a lower chamber defined within the housing and configured to bias the piston assembly upwardly within the piston bore.

13. The safety valve of claim 8, wherein the upper bore is divided into a first upper bore and a second upper bore and wherein the upper piston comprises a first upper piston arranged within and sealingly engaging the first upper bore and a second upper piston arranged within and sealing engaging the second upper bore.

14. The safety valve of claim 13, wherein the first and second upper bores are radially offset from each other within the housing.

15. The safety valve of claim 13, wherein the connecting rod splits and extends into each of the first and second upper bores and attaches to each of the first and second upper pistons.

16. The safety valve of claim 13, wherein a combined piston area of the first and second upper pistons is greater than a piston area of the lower piston.

* * * * *